United States Patent
Camp, Jr.

(10) Patent No.: US 7,729,716 B2
(45) Date of Patent: Jun. 1, 2010

(54) REDUCING POWER CONSUMPTION IN MOBILE TERMINALS BY CHANGING MODULATION SCHEMES

(75) Inventor: William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 679 days.

(21) Appl. No.: 11/614,355

(22) Filed: Dec. 21, 2006

(65) Prior Publication Data

US 2008/0153532 A1 Jun. 26, 2008

(51) Int. Cl.
*H04B 7/00* (2006.01)

(52) U.S. Cl. .................. 455/522; 455/69; 455/63.1; 455/453

(58) Field of Classification Search .......... 455/522, 455/68, 67.11, 69, 442, 115.3, 226.2, 102, 455/205, 500, 67.13, 452.1, 452.2, 453, 450, 455/16, 63.1; 370/208, 210, 335, 395.2, 370/332, 338
See application file for complete search history.

(56) References Cited

U.S. PATENT DOCUMENTS

| | | | |
|---|---|---|---|
| 6,714,551 B1 * | 3/2004 | Le-Ngoc | 370/401 |
| 2003/0202574 A1 * | 10/2003 | Budka et al. | 375/227 |
| 2004/0203981 A1 * | 10/2004 | Budka et al. | 455/522 |
| 2004/0218567 A1 * | 11/2004 | Budka et al. | 370/332 |
| 2005/0118959 A1 * | 6/2005 | Johan et al. | 455/67.11 |
| 2006/0120321 A1 * | 6/2006 | Gerkis et al. | 370/329 |
| 2006/0209767 A1 * | 9/2006 | Chae et al. | 370/335 |
| 2006/0285481 A1 * | 12/2006 | Lane et al. | 370/208 |
| 2007/0049280 A1 * | 3/2007 | Sambhwani et al. | 455/442 |
| 2007/0060057 A1 * | 3/2007 | Matsuo et al. | 455/63.1 |
| 2007/0066337 A1 * | 3/2007 | Hart | 455/522 |
| 2007/0082620 A1 * | 4/2007 | Zhang et al. | 455/69 |
| 2007/0099648 A1 * | 5/2007 | Kim et al. | 455/522 |
| 2007/0111746 A1 * | 5/2007 | Anderson | 455/522 |
| 2007/0165575 A1 * | 7/2007 | Niwano | 370/335 |

FOREIGN PATENT DOCUMENTS

WO 2006004968 A2 1/2006

OTHER PUBLICATIONS

"International Search Report," International Application No. PCT/US2007/085221, May 2, 2008, European Patent Office, Rijswijk, Netherlands.
Aboughazaleh et al., "Dynamic Rate-Selection for Extending the Lifetime of Energy-Constrained Networks," Performance, Computing, and Communications, 2004 IEEE International Conference on, Phoenix, AZ, USA, Apr. 15, 2004, pp. 553-558. ISBN: 0-7803-8396-6. XP-010770112. IEEE, Piscataway, NJ, USA.

* cited by examiner

*Primary Examiner*—Tan Trinh
(74) *Attorney, Agent, or Firm*—Coats & Bennett, P.L.L.C.

(57) ABSTRACT

A mobile terminal reduces power consumption when operating at a high transmit power by altering a modulation scheme used for transmitting signals over an uplink to a base station. The mobile terminal receives uplink load indications from the base station and determines it current transmit power level. Based on this information, the mobile terminal selects an appropriate modulation scheme.

20 Claims, 4 Drawing Sheets

REDUCING POWER CONSUMPTION IN MOBILE TERMINALS BY CHANGING MODULATION SCHEMES

BACKGROUND

Wideband Code Division Multiple Access (WCDMA) phones have recently been introduced into the market. While WCDMA phones provide much higher data rates than phones using older technologies, the newer WCDMA phones consume more power and drain batteries more quickly. Consequently, the battery life and "talk time" for WCDMA phones is significantly less than phones using older technology. The reduced battery life and talk times for WCDMA phones is undesirable from a consumer perspective.

When engaged in normal voice communications, a WCDMA phone transmits continuously. This continuous transmission is one of the primary reasons for the undesirable current drain in WCDMA phones. Another reason for current drain is the presence of a duplexer in the transmit path. The duplexer introduces an undesirable path loss, but is necessary in WCDMA phones because the transmitter and receiver are on simultaneously. Additionally, WCDMA phones require a linear amplifier in the transmit circuitry, which is another reason for the high current drain in WCDMA phones.

Accordingly, there is a continuing need for new systems and methods to reduce power consumption in WCDMA terminals.

SUMMARY

The present invention provides a mobile terminal configured to reduce its power consumption at high transmit powers. In one embodiment, the mobile terminal receives uplink load indications from a base station and determines its current transmit power level. The uplink load indications represent a current load on the uplink. If the uplink load is high, or the mobile terminal's current transmit power is low, the mobile terminal selects a first modulation scheme. If the uplink load is low, and the mobile terminal's current transmit power is high, the mobile terminal selects a second, different modulation scheme. The mobile terminal then uses the selected modulation scheme for modulating signals for transmission over the uplink.

DETAILED DESCRIPTION

The present invention provides a method of reducing power consumption in a mobile terminal when the mobile terminal operates at high transmit powers. Particularly, the mobile terminal selects one of a plurality of modulation schemes with which to modulate a signal to be transmitted to a base station. The selection of an appropriate modulation scheme depends on an uplink load and a current transmit power level of the mobile terminal.

The following description illustrates the present invention as it is applied to a voice channel in a WCDMA radio communication system; however, the techniques of the present invention may also be used to reduce power consumption in other radio communication systems and devices as well. Further, the techniques described herein may be applied to any type of information, such as audio, video, and other data.

Figure 1:
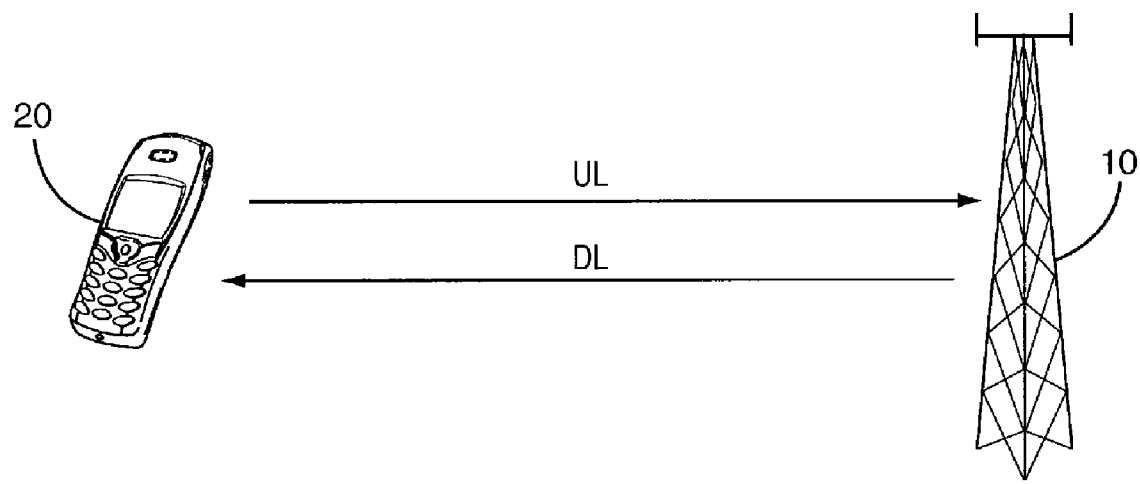
FIG. 1 is a schematic diagram of a communication system.

Turning now to the drawings, FIG. 1 illustrates a base station 10 and a mobile terminal 20 in a WCDMA communication system. The base station 10 transmits voice to the mobile terminal 20 over a downlink channel (DL). The mobile terminal 20 transmits voice to the base station 10 over an uplink channel (UL). For normal voice communications, the transmitter and receiver of the mobile terminal 20 are turned on continuously. This "always on" characteristic of voice communications in WCDMA systems results in excessive drain on battery power of the mobile terminal 20. Other factors, such as the need to use linear power amplifiers in the mobile terminal 20 transmitters, also contribute to excessive battery power drain.

U.S. patent application Ser. No. 11/614,488 describes how a compressed mode may be used in WCDMA systems to reduce power consumption in a mobile terminal when it operates at a relatively low output power. To briefly summarize, a compressed mode is defined for the uplink channel. In the compressed mode, a transmitting terminal alternately turns its transmitter on and off according to a defined compression pattern having a desired duty factor. The compression pattern and the duty factor are selected based on an amount of power headroom of the transmitting terminal. If the amount of power headroom is below a predetermined threshold, the terminal transmits in the compressed mode. Otherwise, the terminal transmits in a normal mode in which the transmitter and receiver are "always on."

Transmitting in the compressed mode, however, may require the terminal to increase it's transmit power level to maintain a desired data rate. Consequently, compressed mode is generally used only when the terminal has sufficient power headroom to increase its transmit power. When the terminal lacks sufficient power headroom, compressed mode generally is not available.

The present invention provides a complimentary method of reducing power consumption when the compressed mode is not available due to the high transmit power levels of the mobile terminal. According to one embodiment, the mobile terminal 20 selects one of a plurality of different modulation schemes, and uses that scheme for modulating signals that are to be sent to the base station. As described below in more detail, the particular modulation scheme selected depends on at least two factors. First, selection is based on a load on the uplink between the base station 10 and the mobile terminal 20. Second, selection is based on a current transmit power level of the mobile terminal 20. Both criteria are evaluated in determining which modulation scheme to apply for transmitting signals to the base station 10.

Figure 2:
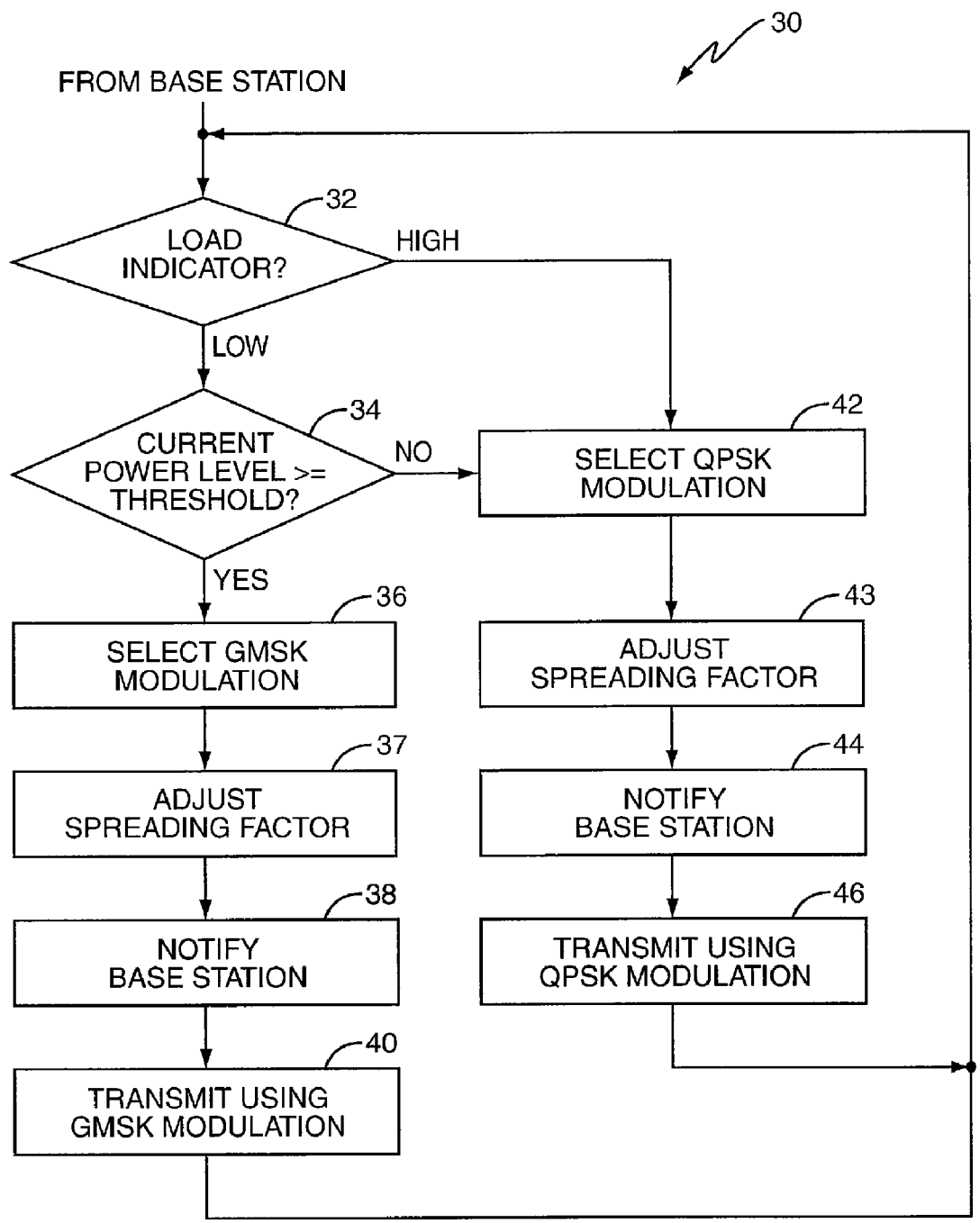
FIG. 2 is a flow chart illustrating modulation-switching control logic implemented in a mobile terminal.

FIG. 2 illustrates an exemplary method 30 implemented by the mobile terminal 20 in which the mobile terminal 20 selects either a Gaussian Minimum Shift Keying (GMSK) modulation scheme or a Quadrature Phase Shift Keying (QPSK) modulation scheme. FIG. 2 specifically discusses GMSK and QPSK; however, this is for illustrative purposes only. The present invention is not limited solely to these two modulation schemes, but rather, may be utilized with any desired modulation schemes.

Initially, the mobile terminal 20 receives a load indicator that indicates the load on the uplink between base station 10 and the mobile terminal 20. The load indicator may be, for example, a bit in which a "1" indicates a relatively high uplink load and a "0" indicates a relatively low uplink load. If the load indicator indicates a low load on the uplink (box 32), the mobile terminal 20 determines whether it's current transmit power level exceeds a predetermined power level threshold (box 34). If the uplink load is low, and if the current transmit power exceeds the predetermined power level threshold, the mobile terminal 20 selects a Gaussian Minimum Shift Keying (GMSK) modulation scheme (box 36) and adjusts the spreading factor (box 37).

Adjusting the spreading factor allows the mobile terminal 20 to accommodate spectral bandwidth constraints when changing modulation schemes. Particularly, the spreading factor for voice communication in WCDMA systems is typically 128 (i.e., there are 128 modulation bits for every information bit transferred in the WCDMA uplink when communicating voice). When the modulation scheme changes, the spreading factor used in the uplink may be changed as well. In this example, there are fewer bits per second transmitted using GMSK modulation than with QPSK modulation. Thus, the mobile terminal 20 may reduce the spreading factor to maintain the transmitted spectrum within the allotted frequency bandwidth. After changing the modulation and adjusting the spreading factor, the mobile terminal 20 notifies the base station 10 of the selection (box 38) and employs GMSK modulation to modulate signals for transmission over the uplink channels (box 40).

Conversely, if the received load indicator indicates a high load on the uplink (box 32), or if the current transmit power level is below the predetermined power level threshold (box 34), the mobile terminal 20 selects a Quadrature Phase Shift Keying (QPSK) modulation scheme (box 42) and adjusts the spreading factor (box 43). In this embodiment, there are more bits per second transmitted using QMSK modulation than with GMSK modulation. Therefore, the mobile terminal 20 may increase the spreading factor when changing to QPSK modulation. The mobile terminal 20 then notifies the base station of the modulation scheme selection (box 44) and modulates all signals for transmission over the uplink using QPSK (box 46).

Figure 3:
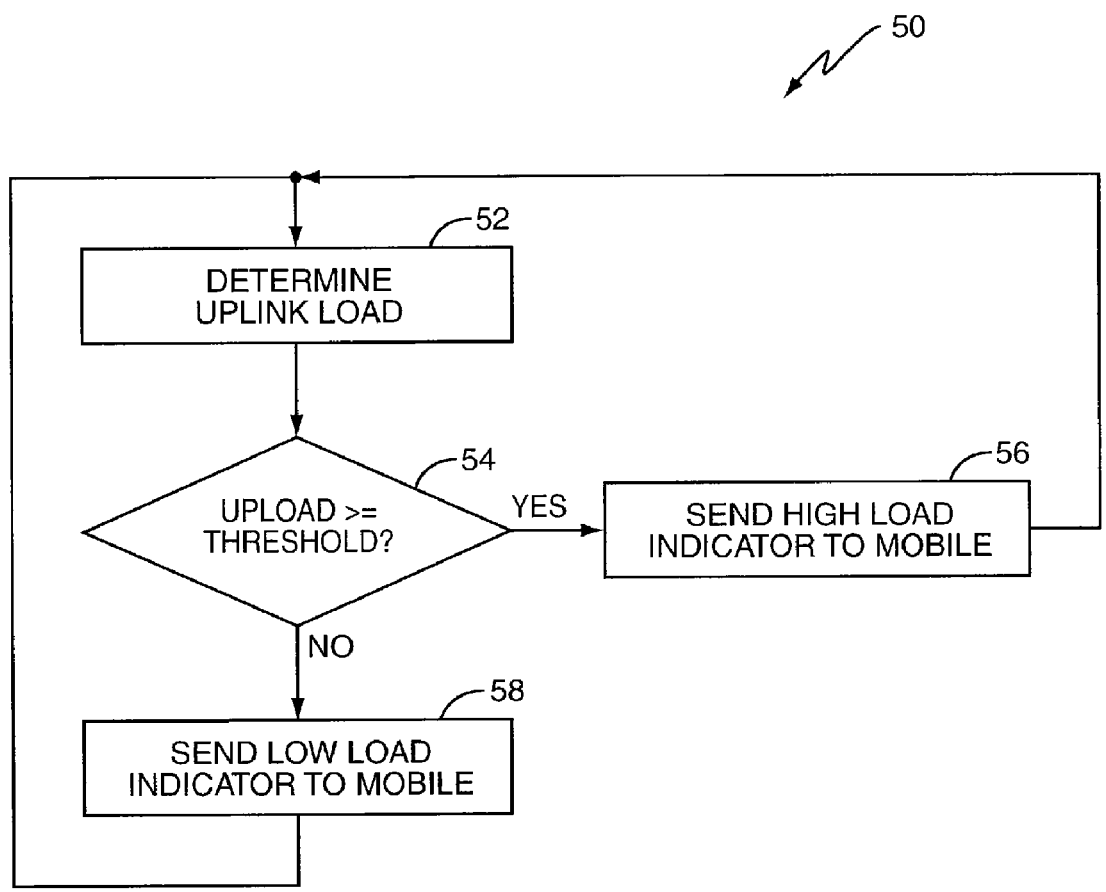
FIG. 3 is a flow chart illustrating how a base station might implement logic to determine uplink load.

FIG. 3 is a flow chart illustrating one exemplary method 50 implemented by the base station 10 to determine the uplink load, and to notify the mobile terminal 20 of the uplink load. Initially, the base station 10 determines the uplink load using any known method (box 52). For example, the base station 10 may base its uplink load determinations on a periodic calculation of the Rise Over Thermal (ROT), which is a ratio between a total power received at the base station 10 and the thermal noise. Other methods by which base station 10 might determine its uplink load is by calculating the total power received at the base station 10, or by determining the number of mobile terminals it currently serves over the uplink, and multiplying by an average power of mobile terminals served. If the load capacity exceeds a predetermined load threshold (box 54), the base station 10 sends a "HIGH" load indicator to the mobile terminal 20 (box 56). If the load capacity does not exceed the predetermined load threshold (box 54), the base station 10 sends a "LOW" load indicator to the mobile terminal 20 (box 58).

Figure 4:
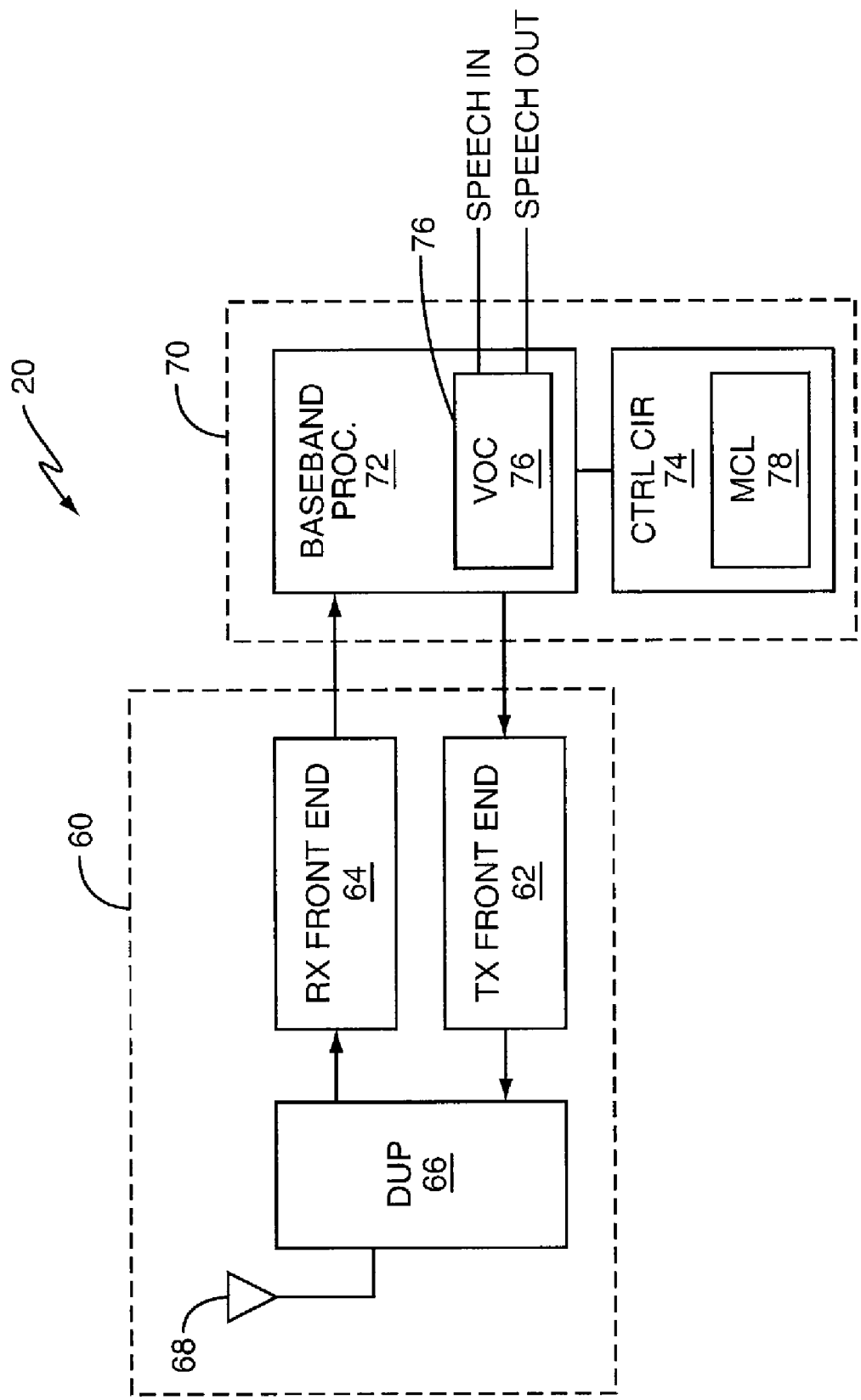
FIG. 4 illustrates an exemplary transceiver station for implementing the modulation-switching control logic.

FIG. 4 illustrates some of the component parts of mobile terminal 20 configured according to one exemplary embodiment of the present invention. The mobile terminal 20 comprises a radio frequency section 60 and a digital section 70. The radio frequency section 60 comprises a transmitter front end circuit 62, a receiver front end circuit 64, and a duplexer 66 that couples both the transmitter front end circuit 62 and the receiver front end circuit 64 to a shared antenna 68. The transmitter front end circuit 62 upconverts, filters, and amplifies signals output by the digital section 70 for transmission via antenna 68. A D-to-A converter (not shown) converts signals output to the transmitter front end 62. Receiver front end circuit 64 downconverts the receive signals to baseband frequency, and then filters and amplifies the received signal. An A-to-D converter (not shown) converts the receive signal to digital form for processing in digital section 70.

The digital section 70 comprises a baseband processor 72 and control circuits 74. The baseband processor 72 and control circuits 74 may comprise one or more processors or processing circuits. The baseband processor 72 processes signals transmitted and received by the mobile terminal 20. For transmitted signals, the baseband processor 72 encodes, modulates, and spreads transmitted signals. As noted earlier, the baseband processor 72 is capable of using any of a plurality of modulation schemes to modulate the signals. Suitable modulation schemes include, but are not limited to, QPSK, GMSK, Phase Shift Keying (PSK), Frequency Shift Keying (FSK), Audio Frequency Shift Keying (AFSK), Minimum Shift Keying (MSK), and Continuous Phase Frequency Phase Shift Keying (CPFSK).

On the receiver side, the baseband processor 72 despreads, demodulates, and decodes the received signal. As above, the baseband processor 72 may use any demodulation scheme known in the art to demodulate the received signal. The baseband processor 72 also implements a vocoder 76 to encode and decode speech signals.

The control circuits 74 control the overall operation of the mobile terminal 20, and include modulation control logic (MCL) 78 for dynamically selecting between a plurality of modulations schemes as previously described. For uplink transmissions, MCL 78 controls the baseband processor 72 to apply a specific modulation scheme to a signal for transmission by the transmitter front end 52 based on the uplink load indicator received from the base station 10 and the current transmit power level of the mobile terminal 20.

Particularly, the MCL 78 selects a first modulation scheme (e.g., GMSK) if the uplink load indicator indicates that the uplink is lightly loaded and if the current transmit power exceeds a predetermined power level. Conversely, MCL 78 selects a second modulation scheme (e.g., QPSK) if the uplink load indicator indicates that the uplink is heavily loaded, or if the current transmit power does not exceed a predetermined power level. The MCL 78 may generate appropriate control signals to the baseband processor 72 to cause the baseband processor 72 to implement the selected modulation scheme. The MCL 78 may select modulation schemes dynamically as changes occur thereby switching between modulation schemes during communications.

The previous embodiments illustrate the uplink load indicator as a single bit having a value of "1" to indicate high loads, and a value of "0" to indicated low uplink loads; however, the present invention is not so limited. The bit could have a value of "0" to indicate high uplink loads and a "1" to indicate low uplink loads. In another embodiment, the load indicator comprises a "multi-bit" load indicator. Multi-bit load indicators are generated by the base station 10 in a manner similar to single bit indicators, and comprise two or more bits. Multi-bit load indicators such as "00," "0," "10," "11," are beneficial in that the multiple bits allow the base station 10 to define the uplink load to a greater level of detail. They also allow the mobile terminal 20 to select other types of modulation schemes based on the multi-bit values. For example, where a single bit indicator may allow the mobile terminal 20 to select between two different modulation schemes, a two-bit indicator could allow the mobile terminal to select between four different modulation schemes.

The present invention provides a method and apparatus for substantially reducing power consumption in a WCDMA terminal, but may be applied to other communication terminals. When applied to a mobile terminal, the present invention results in longer battery life and talk times, and may also beneficially reduce overall interference in the network.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of reducing power consumption in a code division multiple access terminal, said method comprising:
    receiving an uplink load indicator from a base station that indicates a current load on the uplink;
    determining a current transmit power level of the mobile terminal; and
    transmitting over the uplink using a selected modulation scheme based on the current uplink load, and on the current transmit power level.

2. The method of claim 1 wherein transmitting over the uplink using a selected modulation scheme comprises:
    transmitting over the uplink using a first modulation scheme if the current uplink load does not exceed a predetermined load, and if the current transmit power level exceeds a predetermined power level; and
    transmitting over the uplink using a second modulation scheme if the current uplink load exceeds the predetermined load, or if the current transmit power level does not exceed the predetermined power level.

3. The method of claim 2 wherein the first modulation scheme comprises a Gaussian Minimum Shift Keying (GMSK) modulation scheme, and wherein the second modulation scheme comprises a Quadrature Phase Shift Keying (QPSK) modulation scheme.

4. The method of claim 1 wherein the uplink load indicator is based on a detected Rise over Thermal noise level at the base station.

5. The method of claim 1 wherein the uplink load indicator is based on a number of mobile terminals communicating with the base station over the uplink.

6. The method of claim 1 wherein the uplink load indicator is based on a total received signal power at the base station.

7. The method of claim 1 further comprising:
    dynamically selecting the modulation scheme based on the current uplink load and the current transmit power level of the mobile terminal;
    notifying the base station of the selected modulation scheme; and
    transmitting over the uplink using the selected modulation scheme.

8. The method of claim 7 further comprising adjusting a spreading factor based on the selected modulation scheme.

9. A mobile terminal comprising:
    a transmitter configured to transmit signals over an uplink using a selected modulation scheme;
    a control circuit configured to:
        receive an uplink load indicator from a base station that indicates a current load on the uplink;
        determine a current transmit power level of the mobile terminal; and
        select the modulation scheme to modulate the transmit signals based on the current uplink load and the current transmit power level.

10. The mobile terminal of claim 9 wherein the control circuit is further configured to:
    select a first modulation scheme if the current uplink load does not exceed a predetermined load, and if the current transmit power level exceeds a predetermined power level; and
    select a second modulation scheme if the current uplink load exceeds the predetermined load, or if the current transmit power level does not exceed the predetermined power level.

11. The mobile terminal of claim 10 wherein the first modulation scheme comprises a Gaussian Minimum Shift Keying (GMSK) modulation scheme, and wherein the second modulation scheme comprises a Quadrature Phase Shift Keying (QPSK) modulation scheme.

12. The mobile terminal of claim 9 wherein the uplink load indicator is based on a detected Rise over Thermal noise level at the base station.

13. The mobile terminal of claim 9 wherein the uplink load indicator is based on a number of mobile terminals communicating with the base station over the uplink.

14. The mobile terminal of claim 9 wherein the uplink load indicator is based on a total received signal power at the base station.

15. The mobile terminal of claim 9 wherein the control circuit is further configured to:
    dynamically select the modulation scheme based on the current uplink load and the current transmit power level of the mobile terminal;
    notify the base station of the selected modulation scheme; and
    transmit over the uplink using the selected modulation scheme.

16. The mobile terminal of claim 9 wherein the control circuit is further configured to adjust a spreading factor based on the selected modulation scheme.

17. A method of reducing power consumption in a code division multiple access terminal, said method comprising:
    modulating signals to be transmitted to a base station over an uplink;
    altering a modulation scheme used to modulate the signals responsive to changes in an uplink load and on a current transmit power of the code division multiple access terminal.

18. The method of claim 17 wherein altering a modulation scheme comprises changing the modulation scheme from Gaussian Minimum Shift Keying (GMSK) modulation to Quadrature Phase Shift Keying (QPSK) modulation if the uplink load exceeds a predetermined load or if the current transmit power level does not exceed a predetermined power level.

19. The method of claim 17 wherein altering a modulation scheme comprises changing the modulation scheme from Quadrature Phase Shift Keying (QPSK) modulation to Gaussian Minimum Shift Keying (GMSK) modulation if the uplink load does not exceed a predetermined load and if the current transmit power level exceeds a predetermined power level.

20. The method of claim 17 further comprising notifying the base station of the change in modulation schemes.

* * * * *